Patented June 16, 1942

2,286,875

UNITED STATES PATENT OFFICE 2,286,875

MANUFACTURE OF SULPHURIC ACID

Herbert P. Scullin, Naugatuck, Conn., assignor to United States Rubber Company, New York, N. Y., a corporation of New Jersey No Drawing. Application September 4, 1940, Serial No. 355,307

4 Claims. (Cl. 23—172)

The invention relates to improvements in the manufacture of sulphuric acid.

An object of the invention is to utilize Glover tower acid (produced by the chamber process) as a diluent of contact sulphuric acid (produced by the contact process) and produce an acid substantially free of turbidity or cloudiness. Another object is to provide a method of removing turbidity or cloudiness from a mixture of contact sulphuric acid, Glover acid, and spent acid recovered after denitrating and concentrating in the Glover tower of a chamber acid plant. A further object is to produce sulphuric acid of about 66° Baumé (93.19%) substantially free of turbidity after diluting concentrated contact acid with denitrated Glover tower acid, whether or not the Glover tower acid results from concentration of chamber acid alone or from concentration of spent sulphuric acid from other sources or both. Other objects will be apparent from the following description.

The Glover tower in the chamber system, acts as a denitrating and concentrating tower; through this tower may be run the spent acid recovered from the manufacture of nitrobenzol, nitrous vitriol from the Gay Lussac towers, and/or chamber acid. This acid or mixture of acids in running through the tower is met by a stream of hot SO₂ gas which concentrates and denitrates the acid. Usually, at the top of the tower the strength of the acid is 57.5 Baumé (73.5%); after passing through the tower the acid is concentrated to 60° Baumé (77.7% sulphuric acid).

It is highly desirable from a manufacturing standpoint to combine the highly concentrated acid taken from the Glover tower of the chamber process plant, which after concentration in the tower runs from 76–78% of sulphuric acid and more particularly about 60° Baumé (77.7% sulphuric acid), which latter can be used to produce an acid of 66° Baumé, with the more concentrated acid from the contact plant, where the two plants are run in combination. However, the resulting 66° Baumé acid produced is cloudy and thereby less saleable. The exact nature of the material that causes the turbidity of the combination acid is not definitely known. I have found that if the cloudy acid is heated, preferably to about 125° C., that the suspended material causing the cloudiness goes into solution and does not come out of solution on cooling and standing. After the heat treatment the 66° Baumé acid is clear.

The following example illustrates the clarifying process:

Example I 14,000 pounds of turbid Glover tower acid and 11,000 pounds of contact process acid were mixed. This 25,000 pounds of mixed sulphuric acid (93%) which was still turbid after the mixing operation was then clarified in the following manner: A stream of the turbid acid, about 1000 pounds per hour, was run through a lead-jacketed, earthenware heater. The temperature of the acid entering the heater was 15° C. As the acid was going through the heater the temperature was raised to 125° C. As it was not necessary to hold the acid at this temperature, it was cooled and sent to storage. The acid leaving the heater at 125° C. was perfectly clear. Samples of the acid were kept for eight months and no sign of turbidity appeared.

Turbidity of the Glover tower acid is not removable by heating the Glover tower acid alone. Apparently the material causing the turbidity is soluble in the combination acid after heat treatment.

Whereas temperatures of heating the combination acid to clarify the same, should reside in the range from 100 to 130° C., higher or lower temperatures may be used.

Having thus described my invention, what I claim and desire to protect by Letters Patent is:

1. A process of producing a substantially clear sulphuric acid solution from a turbid mixture obtained by mixing fresh Glover tower sulphuric acid and concentrated sulphuric acid produced in the contact process, which comprises heating the turbid mix of the acids to a temperature and for a time sufficient to render the mixed solution substantially free of turbidity.

2. A process of clarifying a cloudy sulphuric acid solution obtained by mixing fresh Glover tower acid with contact acid, which comprises heating the mixed solution to a temperature of about 125° C. for a sufficient period of time to render the acid substantially free of turbidity.

3. A process of clarifying a cloudy sulphuric acid solution obtained by mixing fresh Glover tower acid of about 60° Baumé with more concentrated contact sulphuric acid to produce an acid of about 66° Baumé which comprises heating the cloudy acid solution of about 66° Baumé to a temperature of about 125° C. for a sufficient period of time to render the acid solution substantially free of turbidity.

4. A process of clarifying a cloudy sulphuric acid solution obtained by mixing fresh Glover tower acid with contact acid, which comprises heating the mixed solution to a temperature in the range from 100° to 130° C. for a sufficient period of time to render the acid substantially free of turbidity.

HERBERT P. SCULLIN.